United States Patent
Ho et al.

(10) Patent No.: US 10,664,600 B2
(45) Date of Patent: May 26, 2020

(54) MECHANISMS FOR BOOTING A COMPUTING DEVICE AND PROGRAMMABLE CIRCUIT

(71) Applicant: Intel Corporation, Santa Clara, CA (US)

(72) Inventors: Yah Wen Ho, Penang (MY); Tung Lun Loo, Penang (MY); Yan Fei Lee, Penang (MY)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 15/934,760

(22) Filed: Mar. 23, 2018

(65) Prior Publication Data
US 2019/0042757 A1   Feb. 7, 2019

(51) Int. Cl.
| | | |
|---|---|---|
| *G06F 21/57* | (2013.01) | |
| *G06F 21/76* | (2013.01) | |
| *G06F 9/44* | (2018.01) | |
| *G06F 9/4401* | (2018.01) | |

(52) U.S. Cl.
CPC .......... *G06F 21/575* (2013.01); *G06F 9/4401* (2013.01); *G06F 21/572* (2013.01); *G06F 21/76* (2013.01)

(58) Field of Classification Search
CPC .... G06F 21/575; G06F 21/572; G06F 9/4401; G07F 21/76
See application file for complete search history.

(56) References Cited

U.S. PATENT DOCUMENTS

| | | | | |
|---|---|---|---|---|
| 7,287,154 | B1 * | 10/2007 | Puckette | H04R 1/005 |
| | | | | 703/23 |
| 9,600,291 | B1 * | 3/2017 | Atsatt | G06F 9/4401 |
| 10,031,760 | B1 * | 7/2018 | Santan | G06F 13/10 |
| 2007/0260869 | A1 * | 11/2007 | Dade | G06F 9/4401 |
| | | | | 713/2 |

OTHER PUBLICATIONS

Solid State Technology, "Intel (INTC), Micron (MU) expand NAND flash memory JV", Feb. 29, 2012, 5 pages, https://electroiq.com/2012/02/intel-intc-micron-mu-expand-nand-flash-memory-jv/.
Daniel Allred et al., "Software and hardware challenges due to the dynamic raw NAND market", Jun. 12, 2011, 6 pages, EE Times, https://www.eetimes.com/document.asp?doc_id=1278840.
Doug Wong, "e-MMC vs. NAND with built-in ECC: Advantages of an e-MMC System", Aug. 18, 2011, 7 pages, EE Times, https://www.eetimes.com/document.asp?doc_id=1279018&page_number=2.

(Continued)

*Primary Examiner* — Stefan Stoynov
(74) *Attorney, Agent, or Firm* — Schwabe, Williamson & Wyatt, P.C.

(57) ABSTRACT

Apparatus, systems, or methods for a programmable circuit to facilitate a processor to boot a computing device having the processor. A programmable circuit may include non-volatile storage and firmware stored in the non-volatile storage. The firmware may configure the programmable circuit as a memory controller of a memory device coupled to the programmable circuit, to facilitate the processor to boot the computing device having the processor, the programmable circuit, and the memory device, into operation. Other embodiments may also be described and claimed.

17 Claims, 6 Drawing Sheets

(56) References Cited

OTHER PUBLICATIONS

Andrew Regenscheid, "Platform Firmware Resiliency Guidelines", Draft NIST Special Publication 800-193, May 2018, 47 pages, https://csrc.nist.gov/csrc/media/publications/sp/800-193/draft/documents/sp800-193-draft.pdf.

"Macronix Launches AEC-Q100 Full Compliant NAND Flash Memory", Jul. 18, 2017, 3 pages, http://www.macronix.com/en-us/about/news/Pages/Macronix-Launches-AEC-Q100-Full-Compliant-NAND-Flash-Memory.aspx.

Ken Whitaker, "Embedded memory systems 101", Apr. 25, 2016, 10 pages, http://www.embedded-computing.com/embedded-computing-design/embedded-memory-systems-101.

Rick Merritt, "Intel to Accelerate Altera, Says CEO, Krzanich: ARM cores, long life times OK", Aug. 18, 2016, 5 pages, https://www.eetimes.com/document.asp?docid=1330325.

Rick Merritt, "AMD Copilots Tesla AI chip, Says Report", Sep. 21, 2017, 4 pages, https://www.eetimes.com/document.asp?docid=1332331&_mc=RSS_EET_EDT.

U.S. Department of Transportaion, "Laboratory Test Procedure for FMVSS 111—Rear Visibility—DRAFT", May 6, 2016, 151 pages, Washington, D.C., https://www.nhtsa.gov/staticfiles/nvs/pdf/test-procedures/TP-111V-01.pdf.

\* cited by examiner

MECHANISMS FOR BOOTING A COMPUTING DEVICE AND PROGRAMMABLE CIRCUIT

FIELD

Embodiments of the present disclosure relate generally to the technical fields of computing, and more particularly to the employment of a programmable circuit in facilitating booting a computing device into operation.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computing device may be a device capable of automatically carrying out a sequence of arithmetic or logical operations. A computing device may include many components, e.g., a processor, a memory device, or other components. A programmable circuit may be used in combination with a processor in a computing device to offload processing tasks from the processor to the programmable circuit to speed up some processing tasks. For example, there has been increasing use of programmable circuits, such as field programmable gate arrays (FPGA) to perform artificial intelligence (neural networking) related processing.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

A computing device may include various components, such as, processors, memory devices, and input and output devices. Conventionally, a computing device may be booted first using a read-only-memory (ROM) code to perform some early silicon initialization, e.g., setting up cache, main memory initialization, etc., and then proceed to execute the bootloader for other memory devices to load the operating system from other memory devices. Afterwards, the operating system may control and load a separate kernel driver for handling the memory devices. Hence, the computing device may be booted by using ROM and other memory devices in two separated steps. Such a two steps boot process may be slow, and with increased security risk posted by separated storage devices—a ROM and other memory devices.

Unlike an application specific integrated circuit having a fixed function after the silicon is formed, a programmable circuit may have an undefined function at the time of manufacture, which may be configured (and later on, reconfigured) after being manufactured to perform various functions. For example, a programmable circuit may be a field programmable gate array (FPGA) device, and may have intended functions for applications in areas such as artificial intelligence, deep learning, computer vision and I/O extensions. In addition to the intended functions, a FPGA device may be configured for other purposes, e.g., facilitating a booting process of a computing device.

Embodiments herein may present a computing device that may include a programmable circuit. A programmable circuit may facilitate a processor of a computing device to boot the computing device into operation. For example, a programmable circuit may be configured as a non-volatile memory device controller to boot the computing device with boot code stored in the non-volatile memory device. After the processor has booted the computing device into operation, the programmable circuit may be reconfigured to another function, e.g., as a hardware accelerator of an application. Accordingly, embodiments herein may boot a computing device using one single non-volatile memory device, e.g., a raw NAND flash memory. Hence, the computing device may have increased security and improved speed in the boot process. Initialization of a main memory device of the computing device may be facilitated by a programmable circuit and performed in parallel with other some early silicon initializations of the computing device.

In embodiments, a programmable circuit may include non-volatile storage and firmware stored in the non-volatile storage. The firmware may configure the programmable circuit as a memory controller of a memory device coupled to the programmable circuit, to facilitate a processor to boot a computing device having the processor, the programmable circuit, and the memory device, into operation.

In embodiments, an integrated circuit (IC) package may include a programmable circuit and a processor coupled to the programmable circuit. The programmable circuit may facilitate the processor in booting a computing device having the IC package into operation.

In embodiments, a computing device may include a memory device, a programmable circuit coupled to the memory device, and a processor coupled to the programmable circuit. The programmable circuit may configure itself as a memory controller of the memory device at a power on state or a reset state of the computing device. The processor may boot the computing device into operation at the power on state or a reset state of the computing device, with assistance from the programmable circuit.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" or "computing device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

Figure 1:
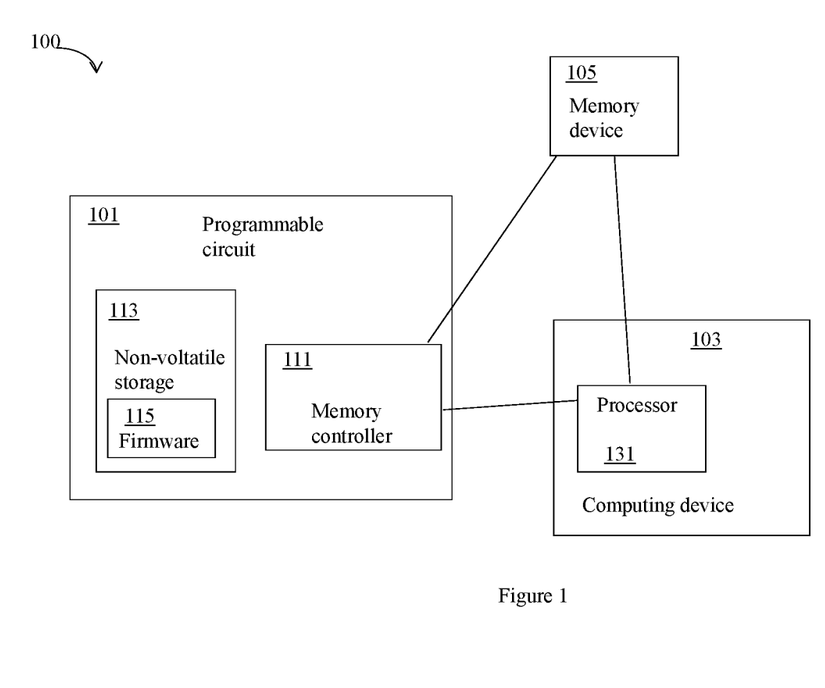
FIG. 1 illustrates an example apparatus including a programmable circuit to facilitate booting a computing device into operation, in accordance with various embodiments.

FIG. 1 illustrates an example apparatus 100 including a programmable circuit 101 to facilitate a processor 131 to boot a computing device 103 having the processor 131, in accordance with various embodiments. For clarity, features of the apparatus 100 for computing, the programmable circuit 101, the computing device 103, and the processor 131, may be described below as an example for understanding an apparatus for computing, a programmable circuit, a computing device, and a processor. It is to be understood that there may be more or fewer components included in the apparatus 100, the programmable circuit 101, the computing device 103, and the processor 131. Further, it is to be understood that one or more of the devices and components within the apparatus 100, the programmable circuit 101, the computing device 103, and the processor 131, may include additional and/or varying features from the description below, and may include any devices and components that one having ordinary skill in the art would consider and/or refer to as an apparatus for computing, a programmable circuit, a computing device, and a processor.

In embodiments, the apparatus 100 may include the programmable circuit 101, the computing device 103, and a memory device 105 coupled to the programmable circuit 101 and the computing device 103. The programmable circuit 101 may include a non-volatile storage 113, where firmware 115 may be stored in the non-volatile storage 113. The programmable circuit 101 may be configured by the firmware 115 as a memory controller 111 for the memory device 105. The memory controller 111 may facilitate the processor 131 to boot the computing device 103, the programmable circuit 101, and the memory device 105, into operation.

In embodiments, the memory device 105 may be any kind of memory device, e.g., a non-volatile memory device, a main memory device, or other kind of memory device. The computing device 103 may include additional components, such as input or output devices, communication interface. As shown in FIG. 1, the programmable circuit 101 and the memory device 105 may be outside the computing device 103. In some other embodiments, the computing device 103 may include the programmable circuit 101, or the memory device 105.

In embodiments, the programmable circuit 101 may be a field programmable gate array (FPGA) device, e.g., an Altera Max 10 device, or any other programmable circuit. After the processor 131 has booted the computing device 103 into operation, the firmware 115 may reconfigure the programmable circuit 101 as a hardware accelerator of an application, or any other intended functions for the programmable circuit 101. Accordingly, the programmable circuit 101 may play a role in the boot process of the computing device 103, in addition to its intended ultimate application functions.

Figure 2:
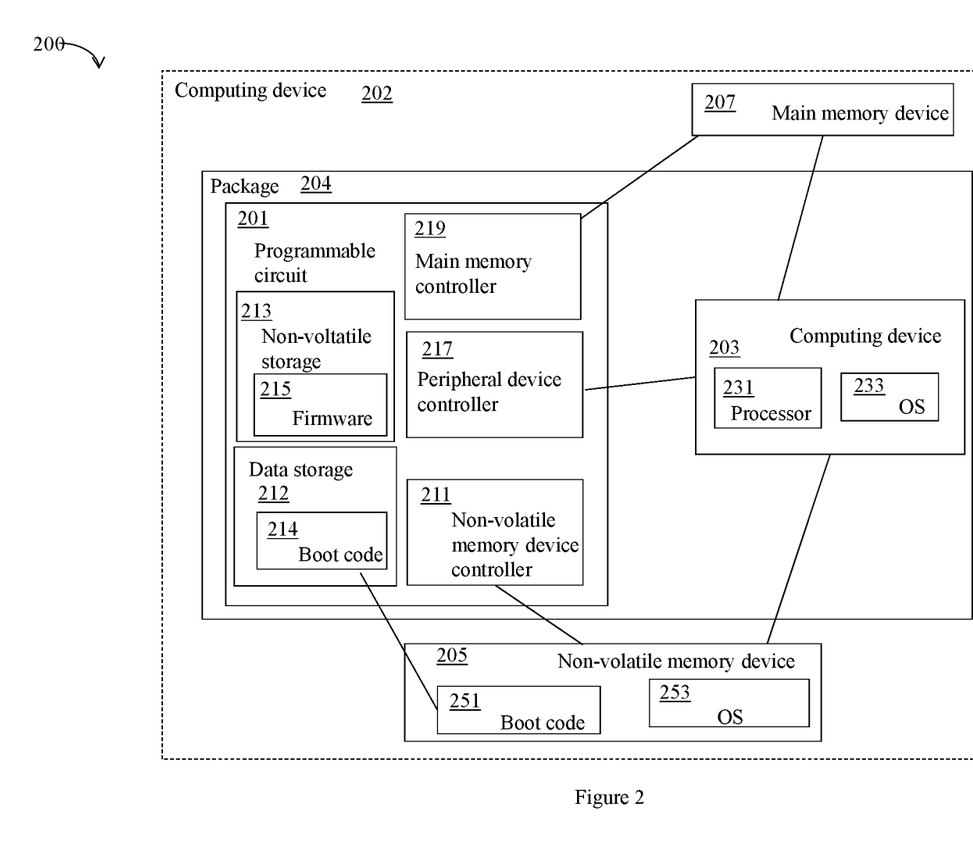
FIG. 2 illustrates another example apparatus including a programmable circuit to facilitate booting a computing device into operation, in accordance with various embodiments.

FIG. 2 illustrates another example apparatus 200 including a programmable circuit 201 to facilitate a processor 231 to boot a computing device 203 having the processor 231, a non-volatile memory device 205, and a main memory device 207, in accordance with various embodiments. In embodiments, the apparatus 200, the programmable circuit 201, the computing device 203, the non-volatile memory device 205, the main memory device 207, and the processor 231, may be examples of the apparatus 100, the programmable circuit 101, the computing device 103, the memory device 105, and the processor 131, respectively, as shown in FIG. 1.

In embodiments, the programmable circuit 201 may facilitate the processor 231 in booting the computing device 203. The computing device 203 may include the processor 231, an operating system 233, and other components. The computing device 203 may be coupled to the programmable circuit 201, the non-volatile memory device 205, and the main memory device 207. In some other embodiments, the programmable circuit 201, the non-volatile memory device 205, the main memory device 207, the processor 231, and the operating system 233 may all be included in a computing device 202. The programmable circuit 201 and the processor 231 may be in a same circuit package 204, e.g., a platform or multi-chip package (MCP).

In embodiments, the programmable circuit 201 may include a non-volatile storage 213, where a firmware 215 may be stored in the non-volatile storage 213. The firmware 215 may include cryptographic service engine (CSE) firmware, power management controller (PMC) firmware, central processing unit (CPU) microcode, BIOS/bootloader, or an operating system itself. In addition, the programmable circuit 201 may include data storage 212, wherein boot code 214 may be stored. In some embodiments, the boot code 214 may be copied into the data storage 212 from the non-volatile memory device 205. In some embodiments, the data storage 212 and the non-volatile storage 213 may be a same storage device. The programmable circuit 201 may configure itself, e.g., by the firmware 215, as a main memory controller 219 of the main memory device 207, as a non-volatile memory device controller 211 for the non-volatile memory device 205, and as a peripheral device controller 217 so that the programmable circuit 201 may act as a peripheral device to the processor 231.

In embodiments, the non-volatile memory device 205 may store the boot code 251, where the boot code 251 may assist the processor 231 in booting the computing device 203 into operation. The processor 231 may access the boot code 251 in the non-volatile memory device 205 through the programmable circuit 201. For example, the boot code 251 may be copied into the data storage 212 within the programmable circuit 201 to become the boot code 214, and the processor 231 may access the boot code 214 from the data storage 212. Furthermore, the non-volatile memory device 205 may store an operation system 253, which may be copied into the computing device 203 after a connection between the computing device 203 and the non-volatile memory device 205 becomes functional. In some embodiments, the non-volatile memory device 205 may be a raw NAND flash memory in a circuit package without a controller within the circuit package, and the computing device 203 may be booted only using the non-volatile memory device 205, which may be a raw NAND flash memory. The use of a single raw NAND flash memory to boot the computing device 203 may provide hardware secure boot to ensure integrity of the computing device 203. Conventionally, a computing device may be booted using a two-step boot process using a separate non-volatile device, e.g., a ROM for the initial boot stage, and other memory devices for a second step booting, which may post security and business concerns.

In embodiments, the non-volatile memory device 205 may be a raw NAND flash memory in a circuit package without a controller within the circuit package. The programmable circuit 201 may be a FPGA device including the data storage 212, and the boot code 251 may be copied into the data storage 212 of the FPGA device from the raw NAND flash memory, and the processor 231 may access the boot code 214 from the data storage 212 of the FPGA device. As such, the FPGA device may facilitate the processor 231 to boot the computing device 203 in about 1000 millisecond (ms) to 1500 ms.

When the overall booting time of the computing device 203 is less than about 1500 ms, the computing device 203 may be used in an automotive solution to satisfy some standards provided by standardization organizations such as US Department of Transportation's National Highway Traffic Safety Administration (NHTSA). For example, NHTSA may mandate a response time for image display for a rearview camera to be less than 2 seconds after a vehicle's direction selector being placed in reverse. When the boot time of the computing device 203 may be less than about 1500 ms, the computing device 203 may be booted when the vehicle's direction selector is placed in reverse, and may still have enough time to set up the rearview camera in less than 2 seconds to meet the NHTSA mandate.

In embodiments, the main memory device 207 may be a main memory to the computing device 203. Conventionally, the main memory device 207 may be initialized by the processor 231 or other ROM at a power on state or a reset state of the computing device 203, before some early silicon initialization of the computing device 203. In some embodiments, the programmable circuit 201 may initialize the main memory device 207 after the programmable circuit 201 may configure itself as the main memory controller 219 of the main memory device 207 at a power on state or a reset state of the computing device 203. The programmable circuit 201 may further notify the processor 231 after the main memory device 207 has been initialized. For example, the programmable circuit 201 may be a FPGA device, and the firmware 215 may be arranged to initialize the main memory device 207 in about 5 ms to 10 ms.

In embodiments, the processor 231 may access the boot code 214 from the data storage 212 at the power on state or the reset state of the computing device 203. The processor 231 may access the boot code 214 before the main memory device 207 coupled to the processor 231 has been initialized. In addition, the processor 231 may further load the operating system 253 from the non-volatile memory device 205 as part of booting the computing device 203 into operation. The loaded operating system 253 may become the operating system 233 in the computing device 203. The processor 231 may further transfer control to the operating system 233. After receipt of control, the operating system 233 may reconfigure the programmable circuit 201 as a hardware accelerator of an application, after the processor 231 has booted the computing device 203 into operation. For example, the programmable circuit 201 may be a FPGA device, and the FPGA device may be configured as a hardware accelerator of an application, after the processor 231 has booted the computing device 203 into operation.

The apparatus 200 may be shown as an example. There may be other implementations of the apparatus 200. For example, in some embodiments, the computing device 202 may include the programmable circuit 201, the non-volatile memory device 205, the main memory device 207, the processor 231, and the operating system 233. In some other embodiments, the main memory device 207 may not be initialized by the programmable circuit 201, and by conventional initialization steps instead.

Figure 3:
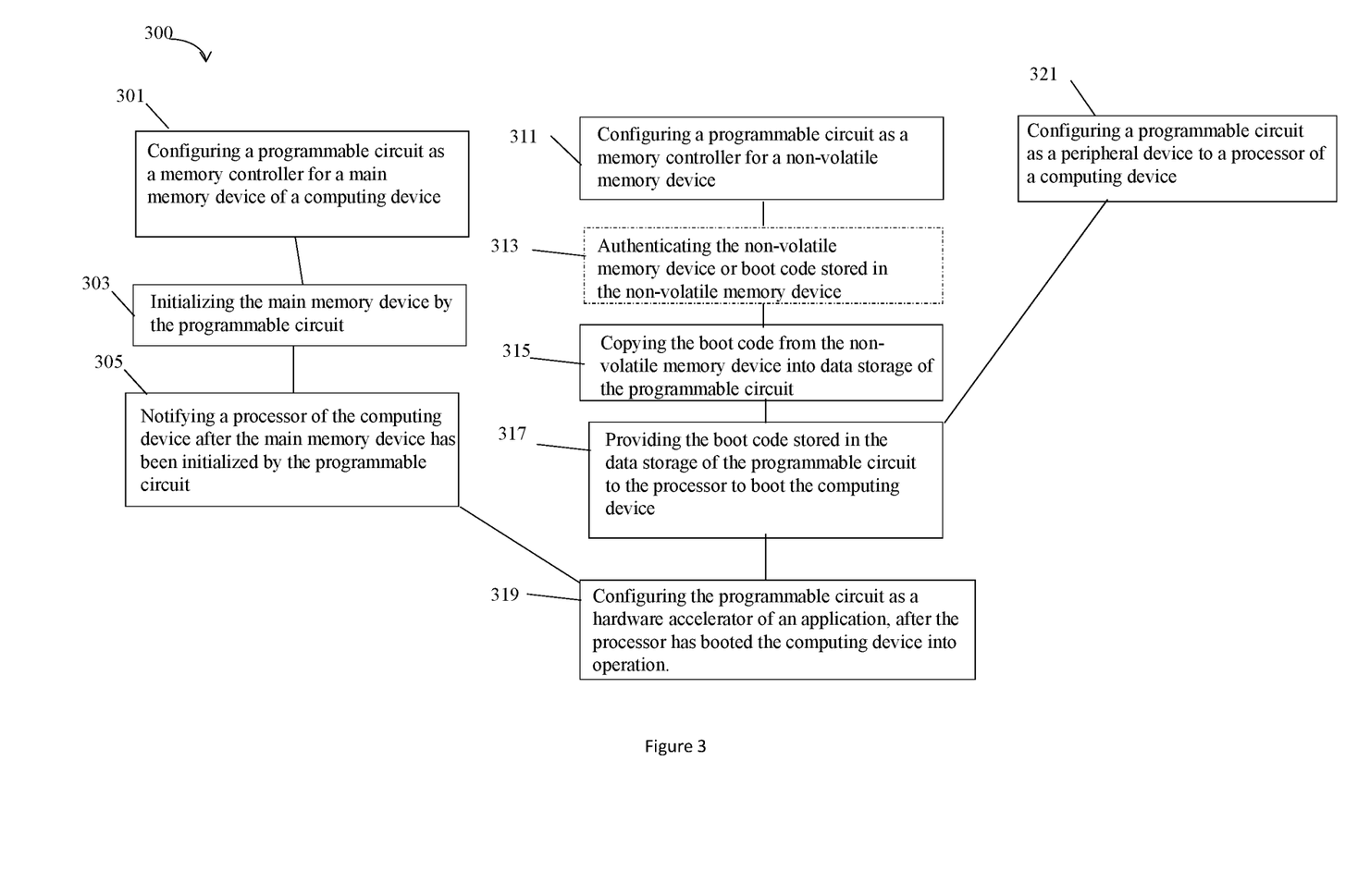
FIG. 3 illustrates an example process performed by a programmable circuit to boot a computing device into operation, in accordance with various embodiments.

FIG. 3 illustrates an example process 300 performed by a programmable circuit to facilitate a processor to boot a computing device having the processor, in accordance with various embodiments. In embodiments, the process 300 may be performed by the programmable circuit 101 to facilitate the processor 131 to boot the computing device 103 having the processor 131, as shown in FIG. 1, or performed by the programmable circuit 201 to facilitate the processor 231 to boot the computing device 203 having the processor 231, as shown in FIG. 2.

The process 300 may start at an interaction 311 and/or 321. During the interaction 311, the programmable circuit may be configured as a memory controller for a non-volatile memory device. During an interaction 321, the programmable circuit may be configured as a peripheral device to a processor of a computing device. In addition, optionally, during an interaction 313, the non-volatile memory device or boot code stored in the non-volatile memory device may be authenticated. During an interaction 315, the boot code may be copied from the non-volatile memory device into data storage of the programmable circuit. During an interaction 317, the boot code stored in the data storage of the programmable circuit may be provided to the processor to boot the computing device.

For example, during the interaction 311, the programmable circuit 201 may be configured as the non-volatile memory device controller 211 for the non-volatile memory device 205. During the interaction 321, the programmable circuit 201 may be configured as the peripheral device controller 217 so that the programmable circuit 201 may act as a peripheral device to the processor 231. In addition, optionally, during the interaction 313, the non-volatile memory device 205 or the boot code 251 stored in the non-volatile memory device 205 may be authenticated, e.g., by the programmable circuit 201. During the interaction 315, the boot code 251 may be copied from the non-volatile memory device 205 into the data storage 212 of the programmable circuit 201 to become the boot code 214. During the interaction 317, the boot code 214 stored in the data storage 212 of the programmable circuit 201 may be provided to the processor 231 to boot the computing device 203.

In addition, the process 300 may start at an interaction 301 instead. During the interaction 301, a programmable circuit may be configured as a memory controller for a main memory device of a computing device. During an interaction 303, the main memory device may be initialized by the programmable circuit. During an interaction 305, a processor of the computing device may be notified by the programmable circuit after the main memory device has been initialized by the programmable circuit.

For example, during the interaction 301, the programmable circuit 201 may be configured as the main memory controller 219 for the main memory device 207 of the computing device 203. During the interaction 303, the main memory device 207 may be initialized by the programmable circuit 201. During the interaction 305, the processor 231 of the computing device 203 may be notified by the programmable circuit 201 after the main memory device 207 has been initialized by the programmable circuit 201.

Furthermore, during an interaction 319, the programmable circuit may be reconfigured as a hardware accelerator of an application, after the processor has booted the computing device into operation. For example, during the interaction 319, the programmable circuit 201 may be reconfigured as a hardware accelerator of an application, after the processor 231 has booted the computing device 203 into operation. In some other embodiments, during the interaction 319, the programmable circuit 201 may be reconfigured to perform other functions.

In some embodiments, the various interactions, e.g., the interaction 301, the interaction 311, and the interaction 321, may be performed in parallel, or in varying orders. Similarly, other interactions may be performed in parallel or in varying orders.

Figure 4:
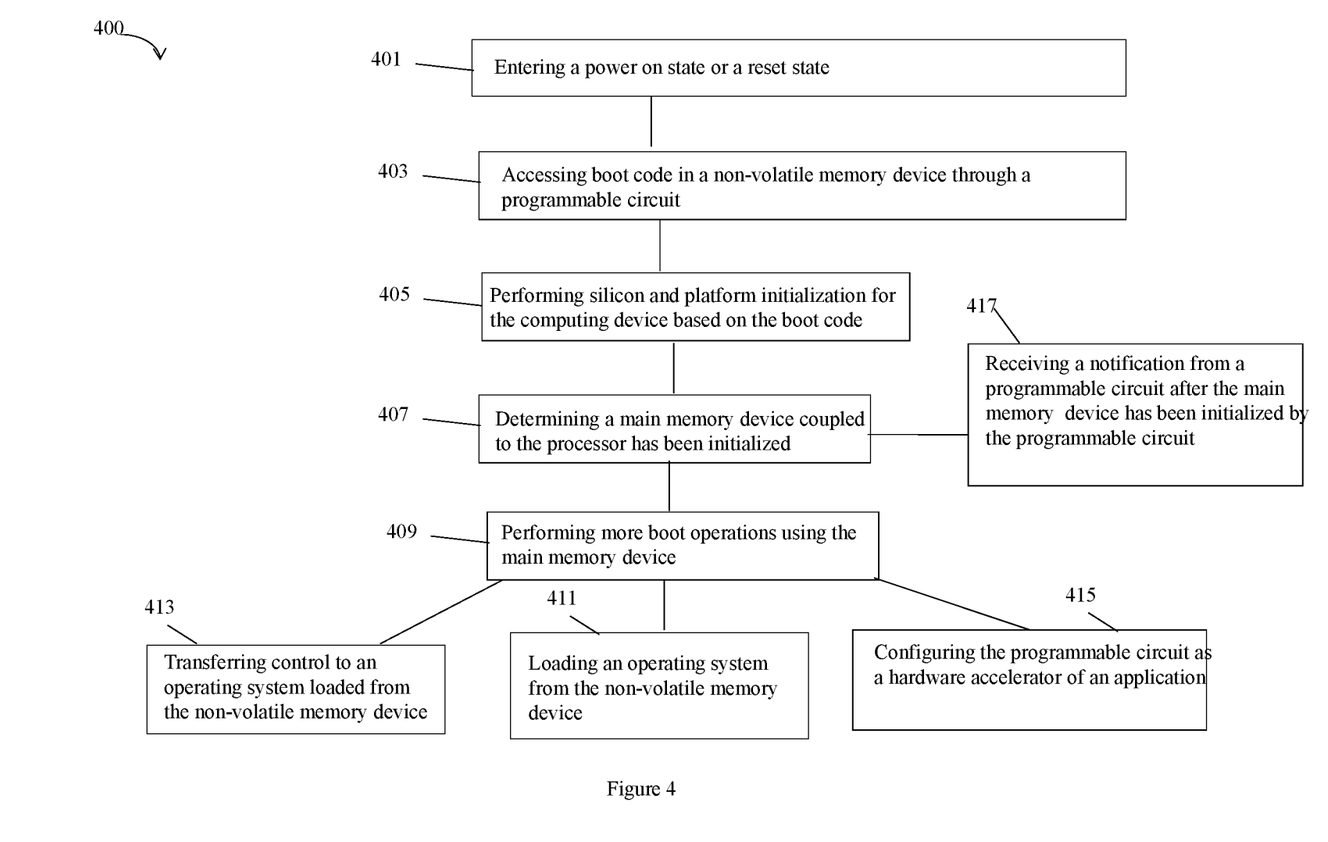
FIG. 4 illustrates another example process to boot a computing device into operation, assisted by a programmable circuit, in accordance with various embodiments.

FIG. 4 illustrates an example process 400 performed by a processor to boot a computing device having the processor assisted by a programmable circuit, in accordance with various embodiments. In embodiments, the process 400 may be performed by the processor 131 to boot the computing device 103 having the processor 131 assisted by the programmable circuit 101, or performed by the processor 231 to boot the computing device 203 having the processor 231 assisted by the programmable circuit 201.

The process 400 may start at an interaction 401. During the interaction 401, the processor may enter a power on state or a reset state. During an interaction 403, the processor may access boot code in a non-volatile memory device through a programmable circuit. During an interaction 405, the processor may perform silicon and platform initialization for the computing device based on the boot code. During an interaction 407, the processor may determine a main memory device coupled to the processor has been initialized. For example, during an interaction 417, the processor may receive a notification from a programmable circuit after the main memory device has been initialized by the programmable circuit. During an interaction 409, the processor may perform more boot operations using the main memory device. Furthermore, during an interaction 411, the processor may load an operating system from the non-volatile memory device. During an interaction 413, the processor may transfer control to the operating system loaded from the non-volatile memory device. During an interaction 415, the processor may configure the programmable circuit as a hardware accelerator of an application.

For example, during the interaction 401, the processor 231 may enter a power on state or a reset state. During the interaction 403, the processor 231 may access the boot code 251 in the non-volatile memory device 205 through the programmable circuit 201. During the interaction 405, the processor 231 may perform silicon and platform initialization for the computing device 203 based on the boot code 251. During the interaction 407, the processor 231 may determine the main memory device 207 coupled to the processor has been initialized. For example, during the interaction 417, the processor 231 may receive a notification from the programmable circuit 201 after the main memory device 207 has been initialized by the programmable circuit 201. During the interaction 409, the processor 231 may perform more boot operations using main memory device 207. Furthermore, during the interaction 411, the processor 231 may load the operating system 253 from the non-volatile memory device 205 to become the operating system 233 within the computing device 203. During the interaction 413, the processor 231 may transfer control to the operating system 233 loaded from the non-volatile memory device 205. During the interaction 415, the processor 231 may configure the programmable circuit 201 as a hardware accelerator of an application.

In some embodiments, the various interactions, e.g., the interaction 401, the interaction 403, or the interaction 417, may be performed in parallel, or in varying orders. Similarly, other interactions may be performed in parallel or in varying orders.

Figure 5:
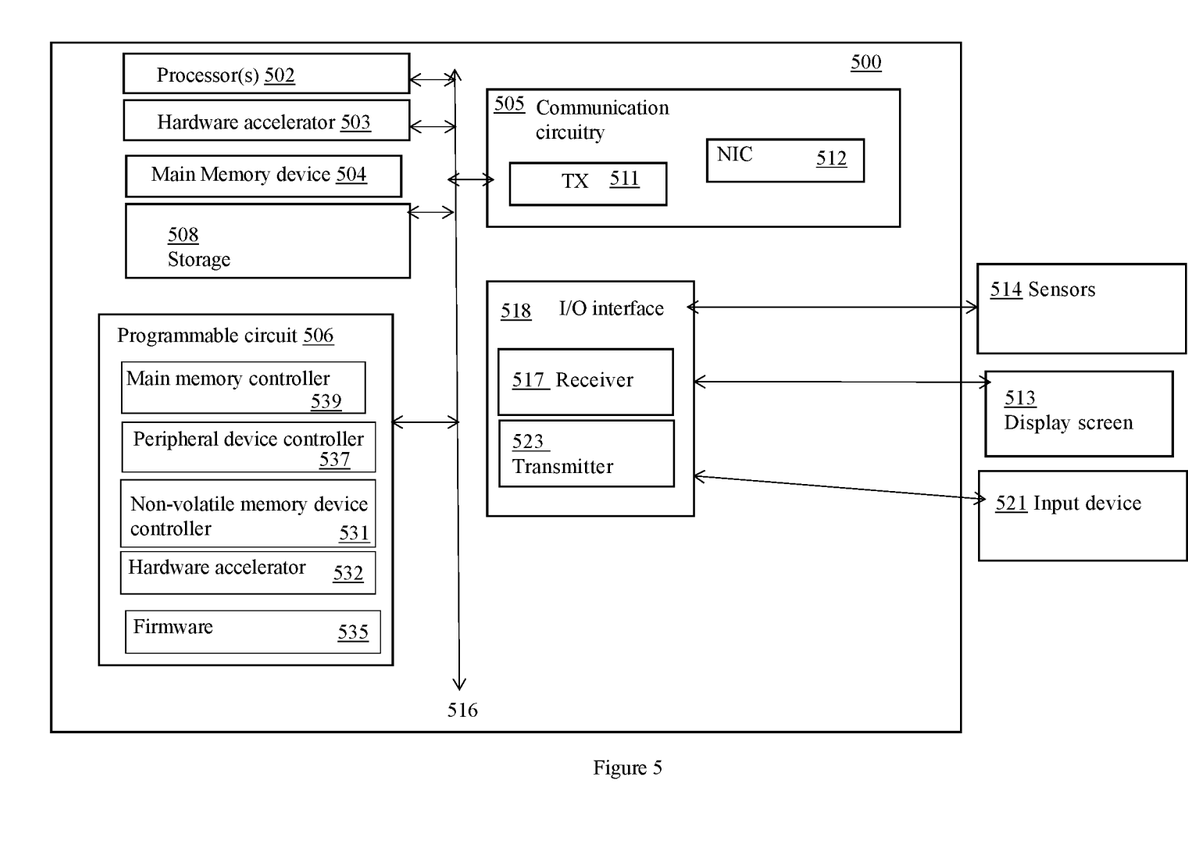
FIG. 5 illustrates an example computing device suitable for use to practice various aspects of the present disclosure, in accordance with various embodiments.

FIG. 5 illustrates an example device 500 suitable for use to practice various aspects of the present disclosure, in accordance with various embodiments. The device 500 may be used to implement functions of the apparatus 100, the apparatus 200, the process 300, or the process 400. As shown, the device 500 may include one or more processors 502, each having one or more processor cores, or and optionally, a hardware accelerator 503 (which may be an ASIC or a FPGA). In alternate embodiments, the hardware accelerator 503 may be part of processor 502, or integrated together on a SOC. Additionally, the device 500 may include a main memory device 504, which may be any one of a number of known persistent storage medium, and a data storage circuitry 508. In addition, the 500 may include an I/O interface circuitry 518 having a transmitter 523 and a receiver 517, and coupled to one or more sensors 514, a display screen 513, and an input device 521. Furthermore, the device 500 may include communication circuitry 505 including a transceiver (Tx) 511, and network interface controller (NIC) 512. The elements may be coupled to each other via system bus 516, which may represent one or more buses. In the case of multiple buses, they may be bridged by one or more bus bridges (not shown).

In addition, the device 500 may include a programmable circuit 506, which may configure itself, e.g., by firmware 535, as a main memory controller 539 for the main memory device 504, as a non-volatile memory device controller 531 for a non-volatile memory device, e.g., the storage circuitry 508, and as a peripheral device controller 537 so that the programmable circuit 506 may act as a peripheral device to the processor 502. Furthermore, the programmable circuit 506 may be configured as a hardware accelerator 532. In embodiments, the programmable circuit 506, the firmware 535, the main memory controller 539, the non-volatile memory device controller 531, and the peripheral device controller 537, may be similar to the programmable circuit 201, the firmware 215, the main memory controller 219, the non-volatile memory device controller 211, and the peripheral device controller 217, as shown in FIG. 2, or other similar components shown in FIG. 1. For example, the programmable circuit 506, and the firmware 535 may be similar to the programmable circuit 101, and the firmware 115 as shown in FIG. 1. Furthermore, the process 502 may be similar to the processor 131 in FIG. 1 or the processor 231 in FIG. 2. The storage 508 may be similar to the memory device 105 shown in FIG. 1, or the non-volatile memory device 205 shown in FIG. 2. In some embodiments, programmable circuit 506 and hardware accelerator 503 may be one of the same, and may be integrated with processor(s) 502 on the same integrated circuit package.

In embodiments, the processor(s) 502 (also referred to as "processor circuitry 502") may be one or more processing elements configured to perform basic arithmetical, logical, and input/output operations by carrying out instructions. Processor circuitry 502 may be implemented as a standalone system/device/package or as part of an existing system/device/package. The processor circuitry 502 may be one or more microprocessors, one or more single-core processors, one or more multi-core processors, one or more multi-threaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 502 may be a part of a SoC in which the processor circuitry 502 and other components discussed herein are formed into a single IC or a single package. As examples, the processor circuitry 502 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the I/O interface circuitry 518 may include a sensor hub, which may act as a coprocessor by processing data obtained from the one or more sensors 514. The sensor hub may include circuitry configured to integrate data obtained from each of the one or more sensors 514 by performing arithmetical, logical, and input/output operations. In embodiments, the sensor hub may capable of timestamping obtained sensor data, providing sensor data to the processor circuitry 502 in response to a query for such data, buffering sensor data, continuously streaming sensor data to the processor circuitry 502 including independent streams for each sensor of the one or more sensors 514, reporting sensor data based upon predefined thresholds or conditions/triggers, and/or other like data processing functions.

In embodiments, the memory 504 (also referred to as "memory circuitry 504" or the like) may be circuitry configured to store data or logic for operating the computer device 500. The memory circuitry 504 may include number of memory devices may be used to provide for a given amount of system memory. As examples, the memory circuitry 504 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known. In various implementations, individual memory devices may be formed of any number of different package types, such as single die package (SDP), dual die package (DDP) or quad die package (Q17P), dual inline memory modules (DIMMs) such as microDIMMs or MiniDIMMs, and/or any other like memory devices. To provide for persistent storage of information such as data, applications, operating systems and so forth, the memory circuitry 504 may include one or more mass-storage devices, such as a solid state disk drive (SSDD); flash memory cards, such as SD cards, microSD cards, xD picture cards, and the like, and USB flash drives; on-die memory or registers associated with the processor circuitry 502 (for example, in low power implementations); a micro hard disk drive (HDD); three dimensional cross-point (3D XPOINT) memories from Intel® and Micron®, etc.

Where FPDs are used, the processor circuitry 502 and memory circuitry 504 (and/or data storage circuitry 508) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 502 to implement various logic functions. The memory cells may include any combination of various levels of memory/storage including, but not limited to, EPROM, EEPROM, flash memory, SRAM, anti-fuses, etc.

In embodiments, the data storage circuitry 508 (also referred to as "storage circuitry 508" or the like), with shared or respective controllers, may provide for persistent storage of information, operating systems, etc. The data storage circuitry 508 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 502; hard disk drives (HDDs); micro HDDs; resistance change memories; phase change memories; holographic memories; or chemical memories; among others. As shown, the data storage circuitry 508 is included in the computer device 500; however, in other embodiments, the data storage circuitry 508 may be implemented as one or more devices separated from the other elements of computer device 500.

In some embodiments, the data storage circuitry 508 may include an operating system (OS) (not shown), which may be a general purpose operating system or an operating system specifically written for and tailored to the computer device 500. The OS may include one or more drivers, libraries, and/or application programming interfaces (APIs), which provide program code and/or software components, and/or control system configurations to control and/or obtain/process data from the one or more sensors 514.

The components of computer device 500 may communicate with one another over the bus 516. The bus 516 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 516 may be a controller area network (CAN) bus system, a Time-Trigger Protocol (TTP) system, or a FlexRay system, which may allow various devices (e.g., the one or more sensors 514, etc.) to communicate with one another using messages or frames.

The communications circuitry 505 may include circuitry for communicating with a wireless network or wired network. For example, the communication circuitry 505 may include transceiver (Tx) 511 and network interface controller (NIC) 512. Communications circuitry 505 may include one or more processors (e.g., baseband processors, modems, etc.) that are dedicated to a particular wireless communication protocol.

NIC 512 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 512 may be included to allow connect to a second network (not shown) or other devices, for example, a first NIC 512 providing communications to the network 150 over Ethernet, and a second NIC 512 providing communications to other devices over another type of network, such as a personal area network (PAN) including a personal computer (PC) device. In some embodiments, the various components of the device 500, such as the one or more sensors 514, etc. may be connected to the processor(s) 502 via the NIC 512 as discussed above rather than via the I/O interface circuitry 518 as discussed infra.

The Tx 511 may include one or more radios to wirelessly communicate with a network and/or other devices. The Tx 511 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 500. In some embodiments, the various components of the device 500, such as the one or more sensors 514, etc. may be connected to the device 500 via the Tx 511 as discussed above rather than via the I/O interface circuitry 518 as discussed infra. In one example, the one or more sensors 514 may be coupled with device 500 via a short range communication protocol.

The Tx 511 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface circuitry 518 may include circuitry, such as an external expansion bus (e.g., Universal Serial Bus (USB), FireWire, Thunderbolt, PCI/PCIe/PCIx, etc.), used to connect computer device 500 with external components/devices, such as one or more sensors 514, etc. I/O interface circuitry 518 may include any suitable interface controllers and connectors to interconnect one or more of the processor circuitry 502, memory circuitry 504, data storage circuitry 508, communication circuitry 505, and the other components of computer device 500. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 516), ports, slots, jumpers, interconnect modules, receptacles, modular connectors, etc. The I/O interface circuitry 518 may couple the device 500 with the one or more sensors 514, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 514 may be any device configured to detect events or environmental changes, convert the detected events into electrical signals and/or digital data, and transmit/send the signals/data to the computer device 500. Some of the one or more sensors 514 may be sensors used for providing computer-generated sensory inputs. Some of the one or more sensors 514 may be sensors used for motion and/or object detection. Examples of such one or more sensors 514 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 514 may include a lens-less image capture mechanism comprising an array of aperture elements, wherein light passing through the array of aperture elements define the pixels of an image. In embodiments, the motion detection one or more sensors 514 may be coupled with or associated with light generating devices, for example, one or more infrared projectors to project a grid of infrared light onto a scene, where an infrared camera may record reflected infrared light to compute depth information.

Some of the one or more sensors 514 may be used for position and/or orientation detection, ambient/environmental condition detection, and the like. Examples of such one or more sensors 514 may include, inter alia, microelectromechanical systems (MEMS) with piezoelectric, piezoresistive and/or capacitive components, which may be used to determine environmental conditions or location information related to the computer device 500. In embodiments, the MEMS may include 3-axis accelerometers, 3-axis gyroscopes, and/or magnetometers. In some embodiments, the one or more sensors 514 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 502, the hardware accelerator 503, the memory 504, the data storage circuitry 508, the input/output interface circuitry 518, the one or more sensors 514, the communication circuitry 505 including the Tx 511, and the NIC 512, and the system bus 516 may perform its conventional functions known in the art. In addition, they may be employed to store and host execution of programming instructions (e.g., via storage 508, main memory device 504 and processor(s) 502) implementing the operations associated with an operating system, and one or more applications, e.g., a neural network of an artificial intelligence applications. The operation system and/or applications may be implemented by assembler instructions supported by processor(s) 502 or high-level languages, such as, for example, C, that can be compiled into such instructions. Operations associated with the device 500 not implemented in software may be implemented in hardware, e.g., via hardware accelerator 503.

The number, capability and/or capacity of these elements 502-539 may vary, depending on the number of other devices the device 500 is configured to support. Otherwise, the constitutions of elements 502-539 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 6:
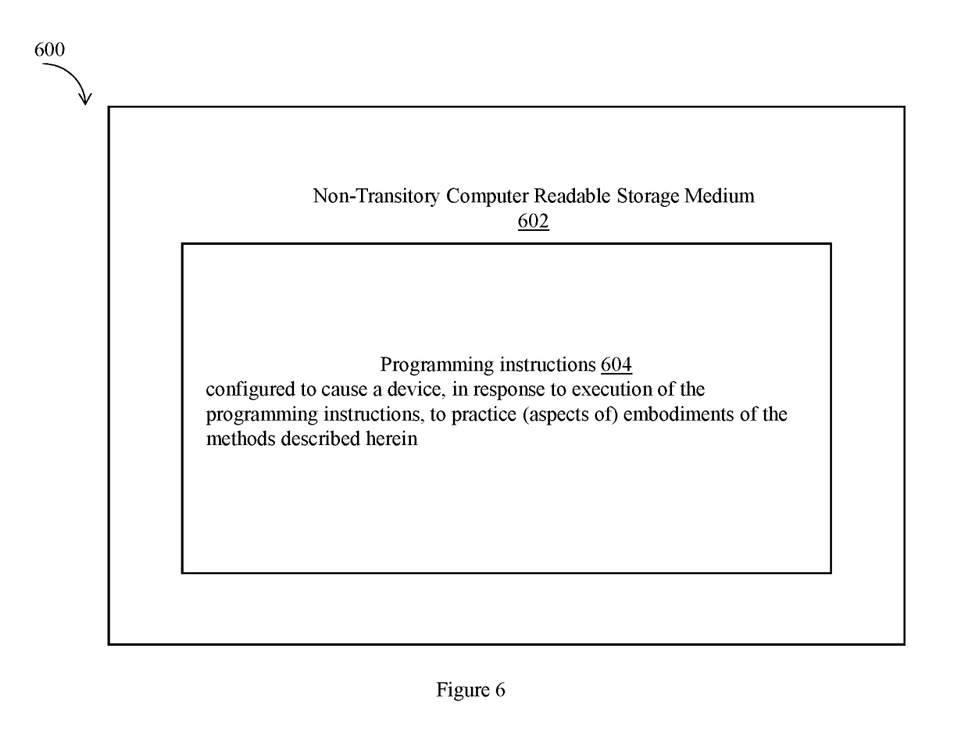
FIG. 6 illustrates a storage medium having instructions for practicing methods described with references to FIGS. 1-5, in accordance with various embodiments.

Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., device 500, in particular, the programmable circuit 506, in response to execution of the programming instructions, to perform, e.g., various operations associated with an apparatus for booting a computing device having a processor assisted by a programmable circuit, as shown in FIGS. 1-5.

In alternate embodiments, programming instructions 604 may be disposed on multiple computer-readable non-transitory storage media 602 instead. In alternate embodiments, programming instructions 604 may be disposed on computer-readable transitory storage media 602, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a programmable circuit, comprising: non-volatile storage; and firmware stored in the non-volatile storage to: configure the programmable circuit as a memory controller of a memory device coupled to the programmable circuit, to facilitate a processor to boot a computing device having the processor, the programmable circuit, and the memory device, into operation.

Example 2 may include the programmable circuit of example 1 and/or some other examples herein, wherein the firmware or an operating system of the computing device is to reconfigure the programmable circuit as a hardware accelerator of an application, after the processor has booted the computing device into operation.

Example 3 may include the programmable circuit of example 1 and/or some other examples herein, wherein the programmable circuit and the processor are in a same circuit package.

Example 4 may include the programmable circuit of example 1 and/or some other examples herein, wherein the memory device is a non-volatile memory device having boot code, and the firmware is arranged to configure the programmable circuit as a non-volatile memory device controller, and additionally as a peripheral device to the processor, wherein to boot the computing device into operation, the processor is to access the boot code in the non-volatile memory device through the programmable circuit.

Example 5 may include the programmable circuit of example 4 and/or some other examples herein, wherein the non-volatile memory device is a raw NAND flash memory in a circuit package without a controller within the circuit package, the programmable circuit is a field programmable gate array (FPGA) device, and the programmable circuit is to facilitate the processor to boot the computing device in about 1000 millisecond (ms) to 1500 ms.

Example 6 may include the programmable circuit of example 4 and/or some other examples herein, further comprising: data storage, wherein the boot code is copied into the data storage from the non-volatile memory device, and the processor is to access the boot code from the data storage.

Example 7 may include the programmable circuit of example 6 and/or some other examples herein, wherein the firmware is further arranged to authenticate the non-volatile memory device or the boot code before copying the boot code into the data storage.

Example 8 may include the programmable circuit of example 6 and/or some other examples herein, wherein the processor is to access the boot code from the data storage after the processor enters a power on state or a reset state.

Example 9 may include the programmable circuit of example 6 and/or some other examples herein, wherein the processor is to access the boot code before a main memory device coupled to the processor has been initialized.

Example 10 may include the programmable circuit of example 6 and/or some other examples herein, wherein the non-volatile memory device is a raw NAND flash memory in a circuit package without a controller within the circuit package, the programmable circuit is a field programmable gate array (FPGA) device including the data storage, and the boot code is copied into the data storage of the FPGA device from the raw NAND flash memory, and the processor is to access the boot code from the data storage of the FPGA device.

Example 11 may include the programmable circuit of example 1 and/or some other examples herein, wherein the memory device is a main memory device of the computing device, and the firmware is arranged to initialize the main memory device, and notify the processor after the main memory device has been initialized.

Example 12 may include the programmable circuit of example 11 and/or some other examples herein, wherein the programmable circuit is a field programmable gate array (FPGA) device, and the firmware is arranged to initialize the main memory device in about 5 millisecond (ms) to 10 ms.

Example 13 may include an integrated circuit (IC) package, comprising: a programmable circuit; and a processor coupled to the programmable circuit, wherein the programmable circuit facilitates the processor in booting a computing device having the IC package into operation.

Example 14 may include the IC package of example 13 and/or some other examples herein, wherein the programmable circuit is to be coupled to a non-volatile memory device of the computing device, the non-volatile memory device having boot code, wherein the programmable circuit, at a power on state or a reset state of the computing device, configures itself as a non-volatile memory device controller of the non-volatile memory device, and additionally as a peripheral device to the processor, and wherein to boot the computing device into operation, the processor accesses the boot code in the non-volatile memory device through the programmable circuit.

Example 15 may include the IC package of example 14 and/or some other examples herein, wherein the boot code is copied from the non-volatile memory device into data storage of the programmable circuit, and the processor is to access the boot code from the data storage of the programmable circuit.

Example 16 may include the IC package of example 15 and/or some other examples herein, wherein the processor is to access the boot code from the data storage of the programmable circuit after the processor enters into a power on state or a reset state.

Example 17 may include the IC package of example 14 and/or some other examples herein, wherein the processor is to further: load and transfer control to an operating system from the non-volatile memory device as part of booting the computing device into operation, wherein after receipt of control, the operating system is to reconfigure the programmable circuit as a hardware accelerator of an application, after the processor has booted the computing device into operation.

Example 18 may include the IC package of example 13 and/or some other examples herein, wherein the computing device further comprises a main memory device and the programmable circuit is to be coupled to the main memory device, wherein at a power on state or a reset state of the processor, the programmable circuit is to initialize the main memory device and to notify the processor after the main memory device has been initialized.

Example 19 may include a computing device, comprising: a memory device; a programmable circuit coupled to the memory device, wherein the programmable circuit configures itself as a memory controller of the memory device at a power on state or reset state of the computing device; and a processor coupled to the programmable circuit, to boot the computing device into operation at a power on state or a reset state of the computing device, with assistance from the programmable circuit.

Example 20 may include the computing device of example 19 and/or some other examples herein, further comprising an operating system to configure the programmable circuit as a hardware accelerator of an application, after the processor has booted the computing device into operation and transferred control to the operating system.

Example 21 may include the computing device of example 19 and/or some other examples herein, wherein the programmable circuit is a field programmable gate array (FPGA) device, and the FPGA device is configured as a hardware accelerator of an application, after the processor has booted the computing device into operation.

Example 22 may include the computing device of example 19 and/or some other examples herein, wherein the memory device is a main memory device; and wherein at the power on state or the reset state of the computing device, the programmable circuit initializes the main memory device and notifies the processor after the main memory has been initialized.

Example 23 may include the computing device of example 19 and/or some other examples herein, wherein the memory device is a non-volatile memory device having boot code, and the programmable circuit configures itself as a peripheral device to the processor at the power on state or the reset state of the computing device, wherein to boot the computing device into operation, the processor accesses the boot code in the non-volatile memory device through the programmable circuit.

Example 24 may include the computing device of example 23 and/or some other examples herein, wherein the non-volatile memory device is a raw NAND flash memory in a circuit package without a controller within the circuit package, and the computing device is booted only using the raw NAND flash memory.

Example 25 may include the computing device of example 23 and/or some other examples herein, wherein the processor is to access the boot code before a main memory device coupled to the processor has been initialized.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:
1. A programmable circuit, comprising:
non-volatile storage; and
firmware stored in the non-volatile storage to:
configure the programmable circuit as a memory controller of a memory device coupled to the programmable circuit, to facilitate a processor to boot a computing device having the processor, the programmable circuit, and the memory device, into operation;
wherein the memory device is a non-volatile memory device having boot code, and the firmware is arranged to configure the programmable circuit as a non-volatile memory device controller, and additionally as a peripheral device to the processor, wherein to boot the computing device into operation, the processor is to access the boot code in the non-volatile memory device through the programmable circuit; and wherein the non-volatile memory device is a raw NAND flash memory in a circuit package without a controller within the circuit package, the programmable circuit is a field programmable gate array (FPGA) device, and the programmable circuit is to facilitate the processor to boot the computing device in about 1000 millisecond (ms) to 1500 ms.

2. The programmable circuit of claim 1, wherein the firmware or an operating system of the computing device is to reconfigure the programmable circuit as a hardware accelerator of an application, after the processor has booted the computing device into operation.

3. The programmable circuit of claim 1, wherein the programmable circuit and the processor are in a same circuit package.

4. The programmable circuit of claim 1, further comprising:
data storage, wherein the boot code is copied into the data storage from the raw NAND flash memory, and the processor is to access the boot code from the data storage.

5. The programmable circuit of claim 4, wherein the firmware is further arranged to authenticate the raw NAND flash memory or the boot code before copying the boot code into the data storage.

6. The programmable circuit of claim 4, wherein the processor is to access the boot code from the data storage after the processor enters a power on state or a reset state.

7. The programmable circuit of claim 4, wherein the processor is to access the boot code before a main memory device coupled to the processor has been initialized.

8. A programmable circuit, comprising:
non-volatile storage; and
firmware stored in the non-volatile storage to:
configure the programmable circuit as a memory controller of a memory device coupled to the programmable circuit, to facilitate a processor to boot a computing device having the processor, the programmable circuit, and the memory device, into operation;
wherein the memory device is a main memory device of the computing device, and the firmware is arranged to initialize the main memory device, and notify the processor after the main memory device has been initialized;
wherein the programmable circuit is a field programmable gate array (FPGA) device, and the firmware is arranged to initialize the main memory device in about 5 millisecond (ms) to 10 ms.

9. An integrated circuit (IC) package, comprising:
a programmable circuit; and
a processor coupled to the programmable circuit,
wherein the programmable circuit facilitates the processor in booting a computing device having the IC package into operation;
wherein the programmable circuit is a field programmable gate array (FPGA) device including data storage; and
wherein the FPGA is to copy boot code from a raw NAND flash memory into the data storage, and the processor is to access the boot code from the data storage of the FPGA device, the raw NAND flash memory being in a circuit package without a controller within the circuit package.

10. The IC package of claim 9, wherein the programmable circuit, at a power on state or a reset state of the computing device, configures itself as a NAND flash memory controller of the raw NAND flash memory, and additionally as a peripheral device to the processor.

11. The IC package of claim 10, wherein the processor is to further:
load and transfer control to an operating system from the raw NAND flash memory as part of booting the computing device into operation, wherein after receipt of control, the operating system is to reconfigure the programmable circuit as a hardware accelerator of an application, after the processor has booted the computing device into operation.

12. The IC package of claim 9, wherein the processor is to access the boot code from the data storage of the programmable circuit after the processor enters into a power on state or a reset state.

13. A computing device, comprising:
a memory device;
a programmable circuit coupled to the memory device, wherein the programmable circuit configures itself as a memory controller of the memory device at a power on state or reset state of the computing device; and
a processor coupled to the programmable circuit, to boot the computing device into operation at a power on state or a reset state of the computing device, with assistance from the programmable circuit;
wherein the memory device is a non-volatile memory device having boot code, and the programmable circuit configures itself as a peripheral device to the processor at the power on state or the reset state of the computing device, wherein to boot the computing device into operation, the processor accesses the boot code in the non-volatile memory device through the programmable circuit;
wherein the non-volatile memory device is a raw NAND flash memory in a circuit package without a controller within the circuit package, and the computing device is booted only using the raw NAND flash memory.

14. The computing device of claim 13, further comprising an operating system to configure the programmable circuit as a hardware accelerator of an application, after the processor has booted the computing device into operation and transferred control to the operating system.

15. The computing device of claim 13, wherein the programmable circuit is a field programmable gate array (FPGA) device, and the FPGA device is configured as a hardware accelerator of an application, after the processor has booted the computing device into operation.

16. The computing device of claim 13, further comprising a main memory device coupled to the processor and the programmable circuit; and wherein at the power on state or the reset state of the computing device, the programmable circuit initializes the main memory device and notifies the processor after the main memory has been initialized.

17. The computing device of claim 16, wherein the processor is to access the boot code before the main memory device has been initialized.

* * * * *